United States Patent
Capitaneanu et al.

(10) Patent No.: US 8,564,994 B2
(45) Date of Patent: Oct. 22, 2013

(54) METHOD OF CONTROLLING AN NPC INVERTER OPERATING IN OVERMODULATION

(75) Inventors: Stefan Capitaneanu, Mousseaux Neuville (FR); Francois Malrait, Jouy sur Eure (FR); Pierre Rouchon, Meudon (FR)

(73) Assignee: Schneider Toshiba Inverter Europe SAS, Pacy sur Eure (FR)

( * ) Notice: Subject to any disclaimer, the term of this patent is extended or adjusted under 35 U.S.C. 154(b) by 239 days.

(21) Appl. No.: 13/032,184

(22) Filed: Feb. 22, 2011

(65) Prior Publication Data
US 2011/0249479 A1 Oct. 13, 2011

(30) Foreign Application Priority Data
Apr. 7, 2010 (FR) .................................... 10 52603

(51) Int. Cl.
H02M 3/24 (2006.01)
(52) U.S. Cl.
USPC ............................................. 363/95; 363/132
(58) Field of Classification Search
USPC .................. 363/17, 35, 36, 95, 97, 98, 132
See application file for complete search history.

(56) References Cited

U.S. PATENT DOCUMENTS

| | | | | |
|---|---|---|---|---|
| 5,355,297 A | * | 10/1994 | Kawabata et al. | 363/43 |
| 5,910,892 A | * | 6/1999 | Lyons et al. | 363/98 |
| 6,031,738 A | * | 2/2000 | Lipo et al. | 363/37 |
| 6,058,031 A | * | 5/2000 | Lyons et al. | 363/67 |
| 6,842,354 B1 | | 1/2005 | Tallam et al. | |
| 7,760,527 B2 | * | 7/2010 | Baudesson et al. | 363/98 |

OTHER PUBLICATIONS

French Preliminary Search Report issued Nov. 23, 2010, in French 1052603, filed Apr. 7, 2010 (with English Translation of Categories of Cited Documents).
Amit Kumar Gupta, et al., "A Simple Space Vector PWM Scheme to Operate a Three-level NPC Inverter at High Modulation Index Including Over-modulation Region, with Neutral Point Balancing", Industry Applications Conference, Fourtieth IAS Annual Meeting, 2005, IEEE, vol. 3, XP010842617, pp. 1657-1664.

\* cited by examiner

*Primary Examiner* — Adolf Berhane
*Assistant Examiner* — Gary Nash
(74) *Attorney, Agent, or Firm* — Oblon, Spivak, McClelland, Maier & Neustadt, L.L.P.

(57) ABSTRACT

A method of controlling a multilevel inverter of NPC (Neutral Point Clamped) type. The method includes regulating the electrical potential of the mid-point when the inverter operates at full voltage, that is to say in overmodulation. In this case, the method firstly determines the position of the control voltage vector in one of the six identical triangles covering the hexagonal vector space and thereafter decomposes the control voltage vector in the triangle by taking account of control combinations, defined in this triangle, for the switching arms.

8 Claims, 3 Drawing Sheets

METHOD OF CONTROLLING AN NPC INVERTER OPERATING IN OVERMODULATION

FIELD

The present invention pertains to a method of controlling a multilevel inverter of NPC (for "Neutral Point Clamped") type. The invention also relates to a variable speed drive including the inverter of NPC type of the invention.

BACKGROUND

An inverter of NPC type is known in the prior art. It comprises in particular three parallel switching arms connected between a positive line and a negative line of a DC bus. Each switching arm is fitted with four power switches linked in series, the power switches being controlled by a control module for the variable speed drive based on a control voltage vector with the aim of controlling an electrical load. The variable drive also comprises a mid-point realized between two capacitors connected in series between the positive line and the negative line of the DC bus, a current passing through the said mid-point.

In the control of an NPC inverter, the main difficulty resides in the regulation of the electrical potential of the mid-point. Indeed, the electrical potential of the mid-point is obtained by dividing the voltages across the terminals of the two capacitors and therefore varies according to the quantity of current delivered to the load. Now, if the potential of the mid-point varies a great deal, a voltage excess appears across the terminals of the capacitors, and this may cause instabilities or even an impairment of these capacitors.

U.S. Pat. No. 6,795,323, U.S. Pat. No. 6,490,185 or U.S. Pat. No. 7,495,938 propose various schemes for regulating the electrical potential of the mid-point. However, these schemes are not suitable when the inverter has to operate at full voltage, or stated otherwise in overmodulation.

SUMMARY

The aim of the invention is therefore to propose a method of controlling an inverter of NPC type in which a control module is able to make the inverter operate in overmodulation without damage to the capacitors.

This aim is achieved by a method of controlling a multilevel inverter of NPC (Neutral Point Clamped) type comprising:
   three parallel switching arms connected between a positive line and a negative line of a bus, each switching arm being fitted with four power switches linked in series, the power switches being controlled by a control module for the variable speed drive based on a control voltage vector with the aim of controlling an electrical load,
   the control module using a hexagonal vector space defining the voltage vectors achievable by the various control combinations for the switching arms, the said various control combinations being defined in six identical triangles covering the vector space, each triangle of the vector space comprising in particular two vertices defining a first side of the triangle and an intermediate point situated on the said first side, the two vertices and the intermediate point each corresponding to a single control combination for the switching arms,
   two capacitors connected in series between the positive line and the negative line of the bus and a mid-point defined between the two capacitors, a current passing through the said mid-point, the method comprising:
   a step of determining a position of the control voltage vector in one of the six identical triangles covering the hexagonal vector space,
   a step of regulating the electrical potential of the mid-point, characterized in that when the inverter operates in overmodulation, the step of regulating the electrical potential of the mid-point comprises:
   a step of determining the positive or negative sign of the product of the current passing through the mid-point times its electrical potential,
   a step of decomposing the control voltage vector by using predominantly the voltage vector of the vector space joining the said intermediate point of the triangle when the sign of the product is negative or by using the two voltage vectors joining the said two vertices of the triangle when the sign of the product is positive.

According to one particular feature, when the sign of the product of the current passing through the mid-point times its electrical potential is positive, the step of decomposing the control voltage vector uses in a minority manner the voltage vector of the vector space joining the intermediate point of the triangle.

According to another particular feature of the control method:
   each triangle comprises a second side and a third side on each of which are defined two intermediate points forming two control combinations for the switching arms when the electrical potential of the mid-point is nonzero, and
   off-modulation, the step of regulating the mid-point comprises for the second side and/or the third side of the triangle, a step of introducing a decomposed vector as a function of the voltage vectors joining the intermediate points of the said side.

According to another particular feature, according to the position of the control voltage vector in one of the triangles of the vector space, the method comprises a step for always bringing the control voltage vector back to one and the same triangle of the vector space.

BRIEF DESCRIPTION OF THE DRAWINGS

Other characteristics and advantages will be apparent in the detailed description which follows while referring to an embodiment given by way of example and represented by the appended drawings in which.

DISCUSSION OF PREFERRED EMBODIMENTS

The invention relates to an inverter of NPC type and the control method implemented when this inverter operates at full voltage. Associated with a rectifier at input, the inverter of NPC type may be employed in a variable speed drive to control an electrical load.

In a known manner, an inverter of NPC type comprises three switching arms 1, 2, 3 connected between a positive line (+) and a negative line (−) of a DC power supply bus. Each switching arm comprises four switches connected in series, for example of IGBT type. On each arm, a connection midpoint separates two switches situated at the top from two switches situated at the bottom. On each arm, the connection mid-point is linked to a phase U, V, W of an electrical load connected at output of the inverter.

The inverter furthermore comprises two capacitors C1, C2 connected in series between the positive line and the negative line of the DC power supply bus. An electrical potential $V_o$ is generated on a mid-point O situated between the two capacitors C1, C2.

For the pulse width modulation control, the scheme for achieving the control orders of the twelve switches of the NPC inverter consists of the steps detailed hereinbelow:

1) Complex Representation

On each switching arm, as a function of the operating of the four switches, the output voltages Vs between the phase and the mid-point O are obtained according to the following chart:

| $T1_1, T2_1, T3_1$ | $T1_2, T2_2, T3_2$ | $T1_3, T2_3, T3_3$ | $T1_4, T2_4, T3_4$ | Vs |
|---|---|---|---|---|
| 1 | 1 | 0 | 0 | Vbus/2 |
| 0 | 1 | 1 | 0 | $V_o = 0$ |
| 0 | 0 | 1 | 1 | −Vbus/2 |

Figure 1:
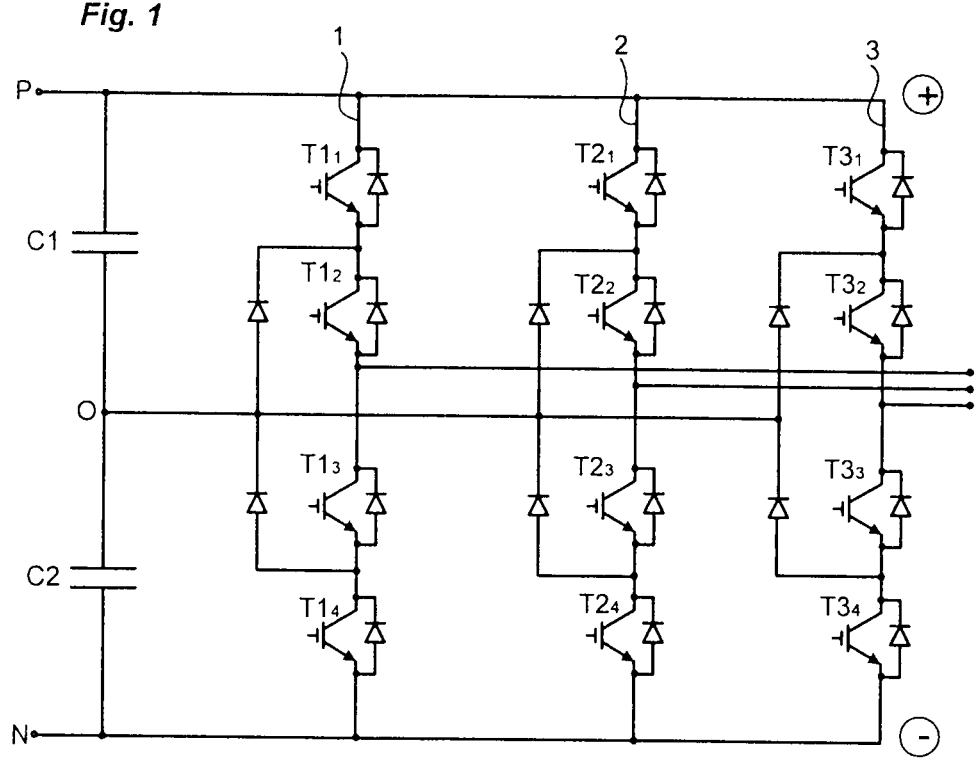
FIG. 1 represents an inverter of NPC type.
Figure 2:
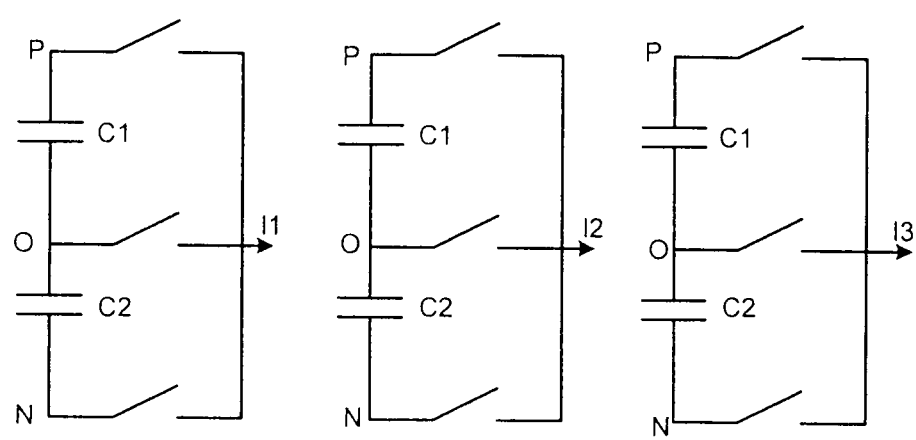
FIG. 2 represents in a simplified manner each switching arm of the inverter of the invention and indicates the mid-current generated by each arm when the mid-point is active.

The three switching arms of the inverter may be shown diagrammatically as represented in FIG. 2. In this figure, P, O, N define the three potentials achieved by ($T1_1$, $T1_2$), ($T1_2$, $T1_3$), ($T1_3$, $T1_4$) respectively on the first switching arm 1 and ($T2_1$, $T2_2$), ($T2_2$, $T2_3$), ($T2_3$, $T2_4$) respectively on the second switching arm 2 and ($T3_1$, $T3_2$), ($T3_2$, $T3_3$), ($T3_3$, $T3_4$) respectively on the third switching arm 3. When the potential O is applied to the first switching arm of the inverter, a current I1 passing through the mid-point is delivered to the load. When the potential O is applied to the second switching arm of the inverter, a current I2 passing through the mid-point is delivered to the load and when the potential O is applied to the third switching arm, a current I3 is delivered to the load. Moreover, it is known that the sum of these three currents is zero: I1+I2+I3=0 and $I_O$=0.

The inverter also comprises a control module intended to dispatch control orders to the switches of the switching arms. For this purpose, this control module uses a hexagonal vector space defining the voltage vectors achievable by the various control combinations for the switching arms.

This hexagonal vector space can be partitioned into six large identical equilateral triangles or into twenty-four small identical equilateral triangles. Each vertex of a small triangle corresponds to one or more control combinations for the switching arms.

Figure 3:
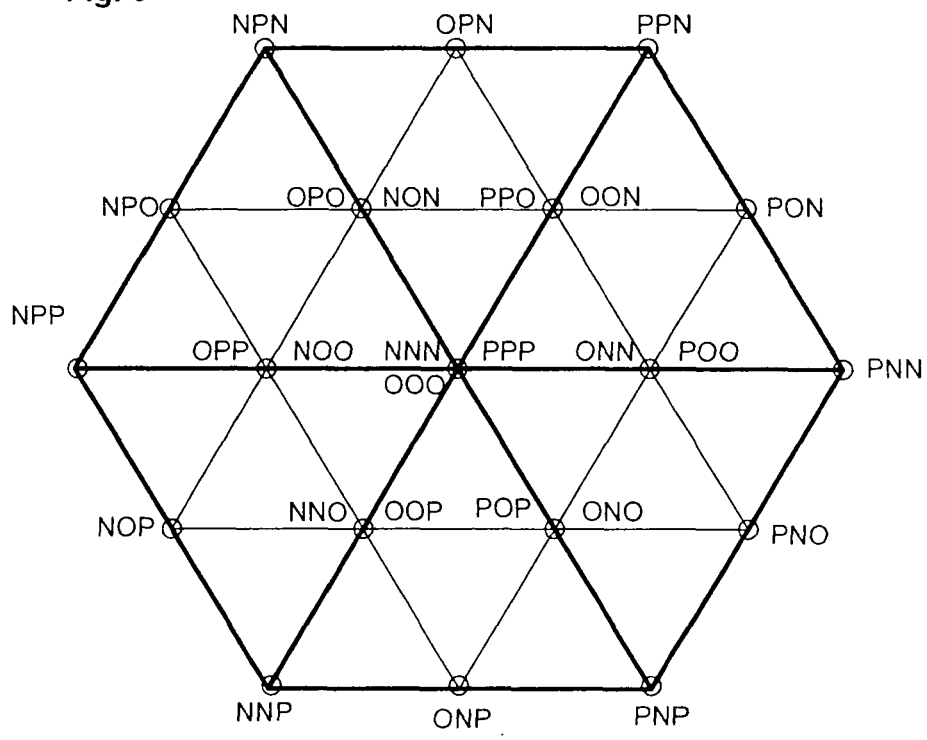
FIG. 3 represents the hexagonal vector space defining the voltage vectors achievable by the various control combinations for the switching arms of the NPC inverter.

In FIG. 3, the points of the hexagon therefore represent voltages achievable with the control orders for the twelve switches of the inverter. For example, on this hexagon, PON is a notation which says that the first arm of the inverter is at the positive level (P or Vbus/2 in the earlier chart) of the power supply voltage of the DC bus, that the second arm is at the level zero (or $V_O$ in the earlier chart) of the power supply voltage of the DC bus and that the third arm is at the negative level (N or −Vbus/2) of the DC bus.

A control voltage vector U intended to be applied to the electrical load connected to the inverter can lie anywhere in the hexagonal vector space defined hereinabove. This control voltage vector can thus be expressed in the following manner as a function of the achievable voltage vectors defined in the vector space:

$$U = C_{PPP} \cdot U_{PPP} + C_{OOO} \cdot U_{OOO} + C_{NNN} \cdot U_{NNN} + \\ C_{POO} \cdot U_{POO} + C_{ONN} \cdot U_{ONN} + C_{PPO} \cdot U_{PPO} + \\ C_{OON} \cdot U_{OON} + C_{PNN} \cdot U_{PNN} + C_{PON} \cdot U_{PON} + \\ C_{PPN} \cdot U_{PPN} + C_{NON} \cdot U_{NON} + C_{OPO} \cdot U_{OPO} + \\ C_{OPP} \cdot U_{OPP} + C_{NOO} \cdot U_{NOO} + C_{POP} \cdot U_{POP} + \\ C_{ONO} \cdot U_{ONO} + C_{PNO} \cdot U_{PNO} + C_{PNP} \cdot U_{PNP} + \\ C_{ONP} \cdot U_{ONP} + C_{NNP} \cdot U_{NNP} + C_{OOP} \cdot U_{OOP} + \\ C_{NNO} \cdot U_{NNO} + C_{NOP} \cdot U_{NOP} + C_{NPP} \cdot U_{NPP} + \\ C_{NPO} \cdot U_{NPO} + C_{NPN} \cdot U_{NPN} + C_{OPN} \cdot U_{OPN}$$

The coefficients $C_{ijk}$ represent the duty ratios and each correspond to the duration of application of the corresponding voltage vector divided by the inverter sampling duration. The total sum of all the coefficients $C_{ijk}$ equals 1.

2) Positioning of the Control Voltage Vector in the Vector Space

Figure 4:
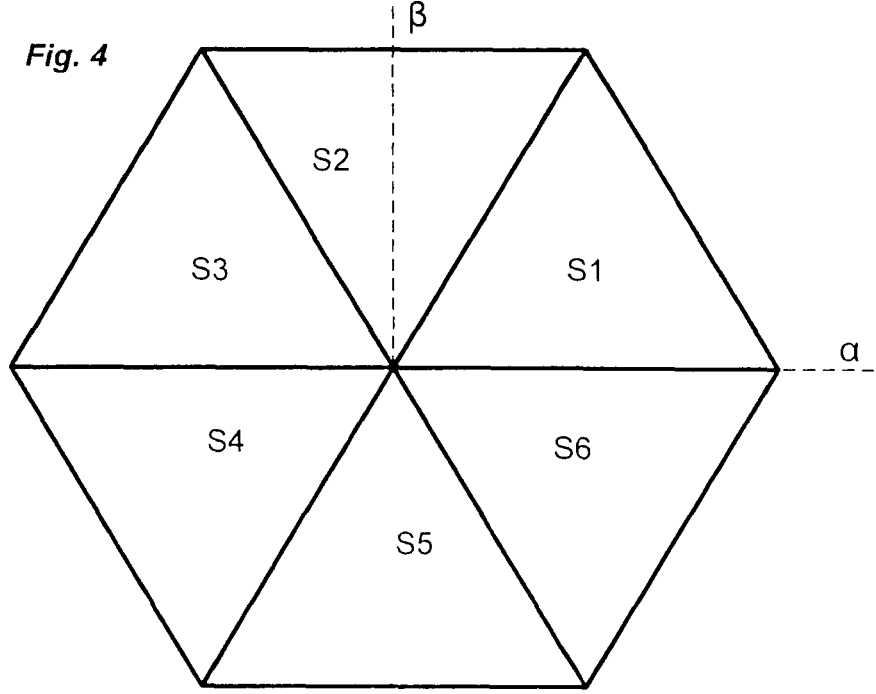
FIG. 4 represents the partitioning into triangles of the hexagonal vector space.

The hexagonal vector space may be divided into six large identical equilateral triangles forming the sectors S1, S2, S3, S4, S5, S6. As a function of the angle θ formed by the control voltage vector in the reference frame (α, β) in FIG. 4, the control voltage vector will be in one of the six large triangles.

3) Reduction of the Hexagon to a Triangle

Figure 5:
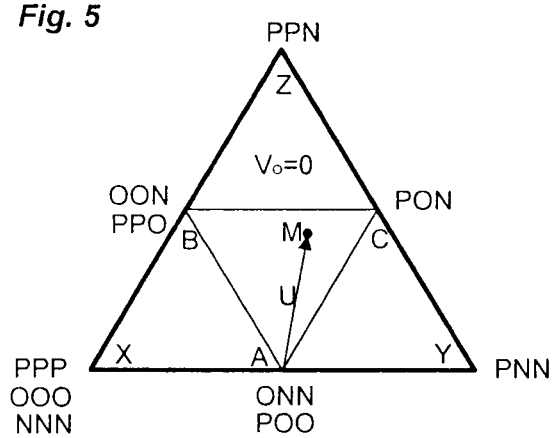
FIG. 5 represents a triangle of the vector space in which a control voltage vector is applied when the potential of the mid-point is zero.

The complex plane defined above is reduced to a single sector (S1) defined in FIG. 5. The control voltage vectors achieved in the sectors S2, S3, S4, S5, S6 may be brought back to the sector S1 by using simple geometric properties associated with permutations of the voltage indices (1, 2, 3). In the chart hereinbelow, J represents a rotation of 2•/3 and $S_H$ a symmetry with horizontal axis. The chart hereinbelow summarizes the operations to be performed which make it possible to bring everything back to the sector S1 when the control voltage vector is situated in one of the other sectors:

|  | Geometric operations | Place of the real indices (123) in S1 | Equivalence of the indices (123) of S1 |
|---|---|---|---|
| S1 |  | 123 | 123 |
| S2 | ⇒ $S_H$ ⇒ J | 123 ⇒ 132 ⇒ 213 | 213 |
| S3 | ⇒ J ⇒ J | 123 ⇒ 231 ⇒ 312 | 312 |
| S4 | ⇒ $S_H$ ⇒ J ⇒ J | 123 ⇒ 132 ⇒ 213 ⇒ 321 | 321 |
| S5 | ⇒ J | 123 ⇒ 231 | 231 |
| S6 | ⇒ $S_H$ | 123 ⇒ 132 | 132 |

The benefit of a simplification such as this is to divide on average by six the number of cases to be considered for the realization of the control voltage vectors over a PWM period.

For example, a control voltage vector present in sector T3 may be brought back to sector S1 by being multiplied by $J^2$. The same holds for the current associated with this control voltage vector.

In sector S1, the control voltage vector U can therefore be expressed in the following simplified manner:

$$U = C_{PPP} \cdot U_{PPP} + C_{OOO} \cdot U_{OOO} + C_{NNN} \cdot U_{NNN} + \\ C_{POO} \cdot C_{POO} + C_{ONN} \cdot U_{ONN} C_{PPO} \cdot U_{PPO} + \\ C_{OON} \cdot U_{OON} + C_{PNN} \cdot U_{PNN} + \\ C_{PON} \cdot U_{PON} C_{PPN} \cdot U_{PPN}$$

4) Positioning in Sector S1

The vector U brought back to sector S1 is situated in one of the four small triangles covering the sector S1 as represented in FIG. 5.

To identify the position of the control voltage vector in one of the four small triangles, it is possible to employ a geometric scheme. The vector product of two vectors is a positively or negatively oriented vector, as a function of the relative position of the two vectors.

Thus, the vector product of the vectors connected to the point M at which the control voltage vector points, therefore makes it possible to identify the position of the control voltage vector in one of the four small triangles.

If AM×AB<0, the point M is therefore in the triangle XAB.
If AM×AB>0, two cases are possible:
 AM×AC<0, the point M is therefore in the triangle ACY.
 AM×AC>0, two cases are possible:
  BM×BC<0, the triangle is in the triangle BCZ.
  Otherwise, the point M is in the triangle ABC.

In the triangle XAB, the control voltage vector U is expressed in the following manner:

$$U = C_{PPP} \cdot U_{PPP} + C_{OOO} \cdot U_{OOO} + C_{NNN} \cdot U_{NNN} + C_{POO} \cdot U_{POO} + C_{ONN} \cdot U_{ONN} + C_{PPO} \cdot U_{PPO} + C_{OON} \cdot U_{OON}$$

In the triangle ACY, the control voltage vector U is expressed in the following manner:

$$U = C_{POO} \cdot U_{POO} + C_{ONN} \cdot U_{ONN} + C_{PNN} \cdot U_{PNN} + C_{PON} \cdot U_{PON}$$

In the triangle BCZ, the control voltage vector is expressed in the following manner:

$$U = C_{PPO} \cdot U_{PPO} + C_{OON} \cdot U_{OON} + C_{PON} \cdot U_{PON} + C_{PPN} \cdot U_{PPN}$$

In the triangle ABC, the control voltage vector is expressed in the following manner:

$$U = C_{POO} \cdot U_{POO} + C_{ONN} \cdot U_{ONN} + C_{PPO} \cdot U_{PPO} + C_{OON} \cdot U_{OON} + C_{PON} \cdot U_{PON}$$

In each triangle, the choice of the vectors and the choice of the duty ratios is made in accordance with various optimization criteria, such as reducing the number of switchings per PWM period, eliminating the overvoltages due to the long cables between the variable drive and the electrical load, etc.

Other criteria for optimizing the control of the NPC inverter may be added so as for example to reduce the Joule losses by switching, reduce the common mode current generated by the PWM strategies, etc.

In the expression for the control voltage vector, it is also necessary to take systematic account of the value of the electrical potential $V_O$ of the mid-point.

5) Regulation of the Electrical Potential of the Mid-Point

Figure 6:
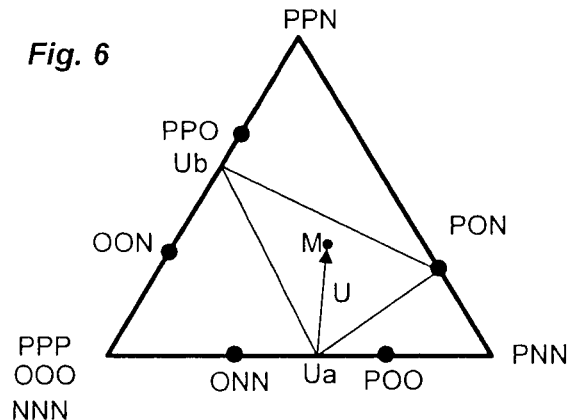
FIG. 6 represents a triangle of the vector space in which a control voltage vector is applied when the potential of the mid-point is nonzero.

When the potential of the mid-point is different from zero, certain achievable voltage vectors of the sector S1 are modified. Thus, as represented in FIG. 6, the voltage vector $U_{PPO}$ becomes different from $U_{OON}$ and $U_{ONN}$ becomes different from $U_{POO}$.

The principle is then to go back to the general case in which the electrical potential of the mid-point is zero. For this purpose, the voltage vectors Ua and Ub, barycentres respectively of ($U_{PPO}$, $U_{OON}$) and ($U_{ONN}$, $U_{POO}$), are introduced. We therefore introduce:

$$Ua = aU_{POO} + (1-a)U_{ONN}$$

$$Ub = bU_{OON} + (1-b)U_{PPO}$$

The principle is then to consider the voltages Ua and Ub defined hereinabove and to choose the coefficients a and b so as to regulate the potential $V_O$ of the mid-point.

$$Ia = aI_{POO} + (1-a)I_{ONN}$$

$$Ib = bI_{OON} + (1-b)I_{PPO}$$

Ia is the current which participates in $I_O$ when choosing the distribution $U_a$. Ib is the current which participates in $I_O$ when choosing the distribution $U_b$. The coefficients a and b hereinabove lie between 0 and 1 so as to regulate the voltage $V_O$ by controlling the current $I_O$.

In the sector S1, each of the achievable voltage vectors corresponds to the appearance of a mid-current $I_O$ passing through the mid-point O. This mid-current is calculated as the sum of the currents $I_1$, $I_2$ and $I_3$ (FIG. 2) when the point O is active. We therefore have $I_1 + I_2 + I_3 = I_O = 0$.

Figure 7:
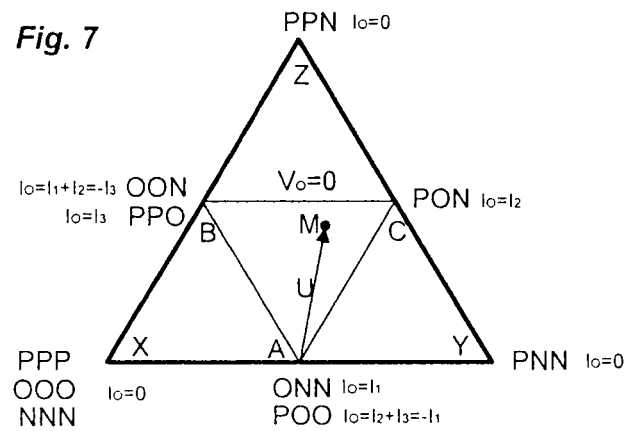
FIG. 7 represents a triangle of the vector space when the potential of the mid-point is zero and shows the values of the mid-current obtained for each control combination for the switching arms.

FIG. 7 represents the sector S1 and indicates the mid-current obtained for each control combination for the switching arms.

for PPP, OOO, NNN we obtain $I_O = 0$
for OON, we obtain $I_O = I_1 + I_2 = I_3$
for PPO, we obtain $I_O = I_3$
for ONN, we obtain $I_O = I_1$
for POO, we obtain $I_O = I_2 + I_3 = -I_1$
for PNN, we obtain $I_O = 0$
for PON, we obtain $I_O = I_2$
for PPN, we obtain $I_O = 0$ According to the control combination ONN or POO, the mid-current $I_O$ obtained equals $I_1$ or $-I_1$ and according to the control combination OON or PPO, the mid-current $I_O$ obtained equals $I_3$ or $-I_3$. It follows that:

$$Ia = -(1-2a)I_1$$

$$Ib = (2b-1)I_3$$

The simplest choice is therefore to take:

$$a = \frac{1 + \text{sign}(V_O I_1)}{2} \text{ and } b = \frac{1 + \text{sign}(V_O I_3)}{2}$$

The result of the "sign" function employed in the two formulae hereinabove can take the value 1 or −1 depending on whether the sign of the products $V_O I_1$ or $V_O I_3$ is positive or negative.

Of course, it is possible to express the coefficients a and b otherwise.

By virtue of the formulation of Ua and Ub, the control voltage vector U is then expressed in the following manner:

$$U = C_{OOO} \cdot U_{OOO} + Ca \cdot Ua + Cb \cdot Ub + C_{PON} \cdot U_{PON} + C_{PPN} \cdot U_{PPN} + C_{PNN} \cdot U_{PNN}$$

The mid-point regulation achieved by virtue of the scheme described hereinabove operates very well when the point M is positioned in the sector S1. However, when the inverter is required to operate at full voltage, that is to say at nominal voltage, the scheme described hereinabove can no longer be employed.

Indeed in this situation, the control voltage vector lies at the edge of the hexagon of the vector space. Now, by reasoning in the sector S1, it is noted that only the control combinations PPN, PON and PNN may be used. As shown in FIG. 7, the combinations PPN or PNN make it possible to obtain a mid-current $I_O = 0$ and the combination PON makes it possible to obtain a mid-current $I_O = I_2$. In all cases, it is therefore impossible to be able to alter the sign of the mid-current $I_O$ as in the previous cases and it therefore becomes impossible to employ the previous scheme to regulate the electrical potential $V_O$ of the mid-point.

However, at full voltage, the control voltage vector U rotates at a speed $\omega s$ of the order of 50 Hz or plus. Thus when the control voltage vector U makes a complete revolution, the mid-currents corresponding to the control combinations achievable on the edges of the hexagon are the following:

if the control voltage vector belongs to S1 the control combination is PON, therefore $I_O=I_2$,
if the control voltage vector belongs to S2 the control combination is OPN, therefore $I_O=I_1$,
if the control voltage vector belongs to S3 the control combination is NPO, therefore $I_O=I_3$,
if the control voltage vector belongs to S4 the control combination is NOP, therefore $I_O=I_2$,
if the control voltage vector belongs to S5 the control combination is ONP, therefore $I_O=I_1$,
if the control voltage vector belongs to S6 the control combination is PNO, therefore $I_O=I_3$.

Now, by taking account of the position $\theta s$ of the control voltage vector so that $$\frac{d\theta s}{dt} = \omega s,$$

it may be proved that:
if the control voltage vector U belongs to S1, then the mid-current $I_O$ is equal to a value X,
if the control voltage vector U belongs to S2, then the mid-current $I_O$ is equal to $-X$,
if the control voltage vector U belongs to S3, then the mid-current $I_O$ is equal to X,
if the control voltage vector U belongs to S4, then the mid-current $I_O$ is equal to $-X$,
if the control voltage vector U belongs to S5, then the mid-current $I_O$ is equal to X,
if the control voltage vector U belongs to S6, then the mid-current $I_O$ is equal to $-X$.

Thus on two consecutive sides of the hexagon, the mid-current $I_O$ associated with a voltage of type $U_{PON}$ takes two equal values but of opposite signs. It is therefore possible to regulate on average over a revolution the electrical potential $V_O$ of the mid-point, in a first situation, by using the achievable voltage vector $U_{PON}$ when the current $I_O$ is of opposite sign to $V_O$ and in a second situation by avoiding using $U_{PON}$ when $I_O$ is of the same sign as $V_O$. In the second situation, it is appropriate to decompose $U_{PON}$ by virtue of $U_{PPN}$ and $U_{PNN}$. However, when this decomposition is employed, it is appropriate to apply the vector $U_{PON}$ during a minimum time, so as to avoid a switching of amplitude E equal to the voltage of the bus.

Thus if the minimum time to be spent on PON is much less than the period of the PWM ($T_{MLI}$), then it is appropriate to modify the barycentric distribution on PON.

Thus, starting from the previous expression for the control voltage vector U according to which:

$$U=C_{OOO} \cdot U_{OOO} + Ca \cdot Ua + Cb \cdot Ub + C_{PON} \cdot U_{PON} + C_{PPN} \cdot U_{PPN} + C_{PNN} \cdot U_{PNN}$$

If $C_{PON} T_{MLI} \leq T\epsilon$ then the control voltage vector U is applied by virtue of the formula:

$$U=C_{OOO} \cdot U_{OOO} + Ca \cdot Ua + Cb \cdot Ub + C_{PON} \cdot U_{PON} + C_{PPN} \cdot U_{PPN} + C_{PNN} \cdot U_{PNN}$$

On the other hand, if $C_{PON} T_{MLI} \geq T\epsilon$ then the equation takes the form:

$$U_{PON} = cU_{PON} + (1-c)\left(\frac{\frac{E}{2}-V_O}{E} U_{PNN} + \frac{\frac{E}{2}+V_O}{E} U_{PPN}\right)$$

With for example $c=\epsilon$ if $\text{sign}(V_O I_2)>0$ and $c=1$ if $\text{sign}(V_O I_2)<0$.

It is thus possible to deduce the time fractions spent on each of the control combinations for the switching arms while avoiding switchings of amplitude equal to E.

The invention claimed is:

1. A method of controlling a NPC (Neutral Point Clamped) multilevel inverter, including:
   three parallel switching arms connected between a positive line and a negative line of a bus, each switching arm including four power switches linked in series, the power switches being controlled by a control module for variable speed drive based on a control voltage vector with aim of controlling an electrical load,
   the control module using a hexagonal vector space defining voltage vectors achievable by control combinations for the switching arms, the control combinations being defined in six identical triangles covering the vector space, each triangle of the vector space including two vertices defining a first side of the triangle and an intermediate point situated on the first side, the two vertices and an intermediate point each corresponding to a single control combination for the switching arms,
   two capacitors connected in series between the positive line and the negative line of the bus and a mid-point defined between the two capacitors, a current passing through the mid-point,
the method comprising:
   determining a position of the control voltage vector in one of the six identical triangles covering the hexagonal vector space;
   regulating the electrical potential of the mid-point;
   wherein when the inverter operates in overmodulation, the regulating the electrical potential of the mid-point comprises:
      determining the positive or negative sign of the product of current passing through the mid-point times its electrical potential;
      decomposing the control voltage vector (1) by using the voltage vector of the vector space joining the intermediate point of the triangle when the sign of the product is negative or (2) by using the two voltage vectors joining the two vertices of the triangle when the sign of the product is positive.

2. A control method according to claim 1, wherein when the sign of the product of the current passing through the mid-point times its electrical potential is positive, the decomposing the control voltage vector uses in a minority manner the voltage vector of the vector space joining the intermediate point of the triangle.

3. A control method according to claim 1, wherein:
   each triangle comprises a second side and a third side on each of which are defined two intermediate points forming two control combinations for the switching arms when the electrical potential of the mid-point is nonzero; and
   in off-modulation, the regulating the mid-point includes for the second side and/or the third side of the triangle, introducing a decomposed vector as a function of the voltage vectors joining the intermediate points of the second and/or third side.

4. A control method according to claim 2, wherein:

each triangle comprises a second side and a third side on each of which are defined two intermediate points forming two control combinations for the switching arms when the electrical potential of the mid-point is nonzero; and in off-modulation, the regulating the mid-point includes for the second side and/or the third side of the triangle, introducing a decomposed vector as a function of the voltage vectors joining the intermediate points of the second and/or third side.

5. A control method according to claim 1, wherein according to the position of the control voltage vector in one of the triangles of the vector space, the method further comprises always bringing the control voltage vector back to one and a same triangle of the vector space.

6. A control method according to claim 2, wherein according to the position of the control voltage vector in one of the triangles of the vector space, the method further comprises always bringing the control voltage vector back to one and a same triangle of the vector space.

7. A control method according to claim 4, wherein according to the position of the control voltage vector in one of the triangles of the vector space, the method further comprises always bringing the control voltage vector back to one and a same triangle of the vector space.

8. A control method according to claim 6, wherein according to the position of the control voltage vector in one of the triangles of the vector space, the method further comprises always bringing the control voltage vector back to one and a same triangle of the vector space.

* * * * *